(12) United States Patent
Morino et al.

(10) Patent No.: US 7,073,823 B2
(45) Date of Patent: Jul. 11, 2006

(54) SEAT BELT SYSTEM FOR A VEHICLE (75) Inventors: Toshimine Morino, Aki-gun (JP); Kenji Satani, Aki-gun (JP); Tatsuya Takahashi, Aki-gun (JP); Kazuhiro Matsuhashi, Aki-gun (JP); Hiroshi Okiyama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 344 days.

(21) Appl. No.: 10/668,596

(22) Filed: Sep. 24, 2003

(65) Prior Publication Data
US 2004/0113410 A1    Jun. 17, 2004

(30) Foreign Application Priority Data
Sep. 25, 2002   (JP) .............................. 2002-279244

(51) Int. Cl.
*B60R 22/00* (2006.01)
(52) U.S. Cl. .................. 280/801.1; 296/65.09
(58) Field of Classification Search ............. 280/801.1, 280/801.2, 808; 296/65.09, 37.2, 37.3, 37.16; 224/542; 297/378.12
See application file for complete search history.

(56) References Cited

U.S. PATENT DOCUMENTS

| | | | | | |
|---|---|---|---|---|---|
| 3,132,781 | A | * | 5/1964 | Poczatek | 224/42.33 |
| 5,332,261 | A | * | 7/1994 | Siepierski | 280/801.1 |
| 5,570,931 | A | * | 11/1996 | Kargilis et al. | 297/378.12 |
| 5,647,611 | A | * | 7/1997 | Boyd et al. | 280/801.1 |
| 5,921,605 | A | * | 7/1999 | Musukula et al. | 296/63 |
| 5,979,725 | A | * | 11/1999 | Lehrman | 224/539 |
| 6,547,300 | B1 | * | 4/2003 | Watanabe et al. | 296/37.3 |

FOREIGN PATENT DOCUMENTS

| | | | |
|---|---|---|---|
| GB | 2130075 A | * | 5/1984 |
| JP | 61-153635 | | 9/1986 |
| JP | 2000-127820 | | 5/2000 |
| JP | 2001-239870 | | 9/2001 |

* cited by examiner

*Primary Examiner*—Paul N. Dickson
*Assistant Examiner*—Tiffany L. Webb
(74) *Attorney, Agent, or Firm*—Nixon Peabody LLP; Donald R. Studebaker (57) ABSTRACT

A seat belt system for a vehicle comprising at least a seat, and a recess which is formed receding downwardly in a floor of the vehicle immediately behind the seat. A cross member extends across the vehicle width above the recess and is fixed to the vehicle body at its opposite ends. A buckle connecting member is connected with a buckle of the seat belt for the seat at one end and connected with the cross member at the other end.

11 Claims, 12 Drawing Sheets

SEAT BELT SYSTEM FOR A VEHICLE

FIELD OF THE INVENTION

The present invention relates to a seat belt system, and more particularly to a seat belt system for a vehicle in which a recess is formed receding downwardly in a floor surface immediately behind at least one seat.

DESCRIPTION OF THE RELATED ART

Conventionally, as disclosed in Japanese Unexamined Utility Model Publication No. S61-153635 and Japanese Unexamined Patent Publication No. 2001-239870, luggage compartment structures of a vehicle such as an automobile have been proposed. The structure includes plural rows of seats disposed in the longitudinal direction of a vehicle, and a luggage compartment formed in a rear portion of the vehicle so as to substantially integrate with a passenger compartment.

The patent literatures also disclose a luggage compartment that can be expanded as needed. The expansion is achieved by selectively arranging the rearmost row of seats in an upright position or a folded position. In an upright position, the seat back is in an upright state on the rear edge of its seat cushion. In a folded position, the seat back is forwardly folded down onto its seat cushion. Additionally, Japanese Unexamined Patent Publication No. 2001-127820 discloses a device having the base structure described above further including a luggage box in a box-shape provided on a floor in a rear portion of the luggage compartment, behind the rearmost seat so that a back surface of the seat back is aligned with an upper surface of the luggage box, with the rearmost seat in the folded state. In the vehicle equipped with the above luggage compartment, a recess is generally formed receding downwardly for storing a spare tire or other parts in a floor surface of the luggage compartment, immediately behind the rearmost row of seats.

Generally, in a seat belt system provided for restraining an occupant in the seat of the vehicle, a buckle, which can releasably engage with a tongue of the seat belt, is attached to the seat cushion via a connecting member comprising a seat belt webbing. However, as described above, in the case of the seat with the seat back selectively arranged into the folded position or the upright position to expand the luggage compartment as needed, the seat cushion should be reduced in thickness as much as possible. The reduced thickness results in reduced rigidity of the seat cushion. As a result, if the buckle is attached to the seat cushion, the occupant restraint performance may be insufficient during an automotive collision or other accidents.

To cope with the problem described above, the connecting member of the buckle is fixed to the vehicular body side (particularly, on the vehicle floor), so that the seat belt tension is transmitted directly to the vehicular body, without being transmitted through the seat. However, in the case of the recess that is formed receding downwardly for storing a spare tire or other parts in a floor surface immediately behind the seat, the connecting member of the buckle is impossible to fix on the floor surface. This drawback may arise in other seats, as well as the rearmost row of seats. For example, whenever a recess is formed receding downwardly in a floor surface immediately behind the seat, the foremost or second row of seats may similarly suffer from this problem.

In addition, from the standpoint of loading capacity of the vehicle, the structures disclosed in the above patent literatures also suffer from the following drawback. That is, the structure disclosed in Japanese Unexamined Utility Model Publication No. S61-153635 allows the rear seat to be selectively arranged into the upright state or the folded state. For the arrangement of the rear seat into the folded state, a dedicated recess should be formed in a floor behind the front seat for storing the rear seat. For a similar reason, the structure disclosed in Japanese Unexamined Patent Publication No. 2001-239870 also includes a recess for storing the rear seat when it is in a folded state.

Recently, the commonality of vehicular body platforms including a vehicular floor has been highly demanded over different vehicular models. However, the structures disclosed in Japanese Unexamined Utility Model Publication No. S61-153635 and Japanese Unexamined Patent Publication No. 2001-239870 require a dedicated recess for storing the rear seat in the floor of the passenger compartment. Because the recess is not always necessary in other vehicular models, the commonality of the platforms is sacrificed, which is unfavorable to cost reduction in the vehicular body.

Additionally, in the structure disclosed in Japanese Unexamined Patent Publication No. 2001-239870, the seat cushion shifts rearwardly during the arrangement operation of the seat back from the upright state into the folded state. Thus, with luggage stored behind the seat back, it is necessary that the luggage be unloaded so as not to interfere with the arrangement operation of the seat back from the upright state into the folded state, which impairs utility of the vehicle.

Moreover, neither Japanese Unexamined Utility Model Publication No. S61-153635 nor Japanese Unexamined Patent Publication No. 2001-239870 refers to ensuring a storing space for a spare tire in the luggage compartment in the rear portion of the vehicle. Thus, if the spare tire is to be stored in the luggage compartment in the rear portion of the vehicle, the spare tire should be placed on the seat back in the folded state. This reduces a loading capacity of the luggage compartment.

The structure disclosed in Japanese Unexamined Patent Publication No. 2001-127820 does not require the recess for storing the seat, and allows the seat back to be arranged into the folded state from the upright state without the removal of the luggage stored behind the seat back. However, Japanese Unexamined Patent Publication No. 2001-127820 also does not refer to ensuring a storing space for the spare tire in the luggage compartment in the rear portion of the vehicle, and thus, suffers from the similar drawback of the structures disclosed in Japanese Unexamined Utility Model Publication No. S61-153635 and Japanese Unexamined Patent Publication No. 2001-239870 in terms of the loading capacity.

SUMMARY OF THE INVENTION

In view of the above problem, an object of the present invention is to provide a seat belt system for a vehicle in which the seat belt tension is directly transmitted to a vehicular body without being transmitted through a seat, even when a recess is formed receding downwardly in a floor surface immediately behind the seat, preferably in a favorable manner to loading capacity and commonality of platforms.

For overcoming the above problem, in accordance with an exemplary embodiment of the present invention, there is provided a seat belt system for a vehicle. The vehicle includes a seat disposed on a floor of the vehicle and a recess formed downwardly in the floor immediately behind the seat. A cross member is fixed to a vehicular body at its opposite ends so as to extend across the vehicular width above the recess, and a buckle connecting member is connected with a buckle of a seat belt for the seat at one end and connected with said cross member at the other end.

Accordingly, the load acting on the seat belt is transmitted to the vehicular body through the cross member. That is, even if the recess is formed receding downwardly in the vehicular floor immediately behind the seat, the load acting on the seat belt is directly transmitted to the vehicular body without being transmitted through the seat. As a result, less rigidity is required in the seat, which reduces the thickness of the seat cushion (hence the entire seat). Additionally, the cross member advantageously increases the rigidity of the vehicular floor.

Preferably, the recess may be provided for storing a spare tire, and the cross member may be located so as to cause no interference against the spare tire during loading and unloading work of the spare tire into and from the recess.

Accordingly, even in a vehicle which stores the spare tire in the recess formed in the vehicular floor immediately behind the seat, the load acting on the seat belt is advantageously transmitted to the vehicular floor while the spare tire can be easily stored.

More preferably, the seat may be selectively arranged into an upright position where a seat back of the seat is substantially upright near the rear edge of the seat cushion of the seat, or into a folded position where the seat back is forwardly folded down onto the seat cushion of the seat, the seat cushion may be mounted on the vehicular floor movably in at least one of the longitudinal direction and vertical direction of the vehicle following the selective arrangement operation of the seat back. The buckle connecting member may be fixed to the cross member at a first fixing portion and fixed to the seat cushion at a second fixing portion between the first fixing portion and the buckle, and the length between said first fixing portion and said second fixing portion may be predetermined so as to allow the buckle connecting member to accommodate the motion of the seat cushion.

Accordingly, a largely-expanded space is ensured for storing luggage or other materials on the seat back in the folded position because the seat is reduced in thickness, while the buckle is prevented from adversely dropping down through the clearance between the seat back and seat cushion because the buckle connecting member is fixed to the cross member at the first fixing portion and fixed to the seat cushion at the second fixing portion between the first fixing portion and the buckle. Moreover, the length between the first fixing portion and the second fixing portion is predetermined so as to allow the buckle connecting member to accommodate the motion of the seat cushion. Thus, in spite of the fact that the seat cushion is movable in at least one of the longitudinal direction and vertical direction of the vehicle following the selective arrangement operation of the seat back, the buckle connecting member causes no interference against the motion of the seat cushion.

Further, a first guide mechanism may be provided for guiding the motion of the seat cushion while maintaining a substantially constant distance between the first fixing portion and the second fixing portion during the motion of the seat cushion.

Accordingly, the need for tolerance is eliminated from the buckle connecting member, thereby further enhancing the occupant-restraint performance of the seat belt during an automotive collision or other accidents.

Still further, a depression may preferably be formed on an upper portion of the seat cushion for storing the buckle.

Accordingly, even with the seat back in the folded position, the buckle can be stored in the depression, which lowers the height of the seat, thereby further expanding the luggage compartment as a space formed on the seat in the folded position.

Still further, the cross member may be concealed by the seat back from above with the folded position of the seat back.

Accordingly, the cross member is prevented from impairing the visual appearance of the luggage compartment.

Still further, a box-like sub trunk may preferably be removably provided behind the seat. The seat and the sub trunk may be adapted so that a back surface of the seat back and an upper surface of the sub trunk substantially align with each other, and the recess is covered with the seat back from above at its front portion and covered with the sub trunk from above at its rear portion, with the seat back in the folded position.

Accordingly, small luggage is accommodated in the box-shape sub trunk disposed on the floor behind the seat. Additionally, the seat is stored with its seat back in the folded position without the need for any dedicated recess for storing the seat, in other words, without the sacrifice of the commonality of vehicular body platforms, because the back surface of the seat back and the upper surface of the sub trunk align with each other with the seat back in the folded position. Also, large luggage can be stored on a continuous planar surface constituted by the back surface of the seat back and the upper surface of the sub trunk. Moreover, in a normal state, the recess is covered with the seat from above at its front portion, and covered with the sub trunk at its rear portion, which does not impair the visual appearance. In this case, the sub trunk is removably attached to the floor of the luggage compartment. This allows the spare tire to be smoothly stored in the recess. Additionally, the sub trunk can be detached if unnecessary, enhancing the utility. Moreover, the recess can be used for storing other luggage than a spare tire if the spare tire can be stored at other portions in the vehicle. Thus, the commonality of the platforms is maintained between the model in which the spare tire is stored in the recess and the other model in which the spare tire is not stored in the recess.

Still further, the sub trunk may preferably comprise a central section at the laterally central position and a pair of side sections on the right and left sides of the central section, respectively, with the side sections being permanently attached to the floor behind the seat, and the central section being removably attached to the floor behind the seat.

Accordingly, the volume of the removable section is smaller, thereby enhancing the ease in detaching/attaching operation of the sub trunk.

Still further, an engagement structure may preferably be provided between the central section and the side sections so as to allow the central section to releasably engage the side sections.

Accordingly, ease in attaching/detaching operation of the central section is enhanced, and secure engagement of the central section with the side sections (in other words, with the luggage floor) is ensured during the use of the central section.

Still further, the floor may preferably include a lower-situated front floor, a higher-situated rear floor continuing to the front floor, and a step raising the rear floor at the rear edge of the front floor by a predetermined height, the seat may be mounted on the rear floor, the seat cushion may comprise a seat cushion frame bending down towards its front edge and a cushion material covering at least over the cushion frame, and a second guide mechanism may be provided which downwardly displaces the seat cushion during the fold down operation of the seat back and guides the seat cushion so that the front edge of the seat cushion frame is located in front of the step with the seat back in the folded position.

Accordingly, the seat is disposed on the higher-situated rear floor continuing to the lower-situated front floor, and the seat back is displaced downwardly via the second guide mechanism by the fold-down operation of the seat back while the seat back is forwardly folded down. This lowers the height of the seat, thereby further enhancing the loading capacity. Moreover, the cushion frame of the seat bends down towards its frontal edge, which ensures the thickness at the front and upper portion of the seat cushion, thereby providing the favorable seating comfort of the seat. Further, while the seat back is forwardly folded down, the fold-down operation causes the frontal edge of the cushion frame to forwardly shift up to the position ahead of the step in the floor. Thus, even with luggage stored behind the seat back in the upright position, the seat is surely prevented from interfering against the luggage during the arrangement of the seat back into the folded position, so that the seat back is folded down without impairing the utility. At this time, the front edge of the cushion frame, curving downwardly in shape, is located ahead of the step in the floor of the passenger compartment, thereby avoiding the interference between the front edge of the cushion frame and the rear floor. It should be appreciated that the structure of the floor surface in the rear portion of the vehicle, that is, the structure with the lower-situated front floor, the higher-situated rear floor, and the step connecting them, has been widely adopted in conventional vehicles and thus does not prevent the communization of platforms.

Other features, aspects, and advantages of the present invention will become apparent from the following description of the invention which refer to the accompanying drawings.

DETAILED DESCRIPTION OF THE INVENTION

Figure 1:
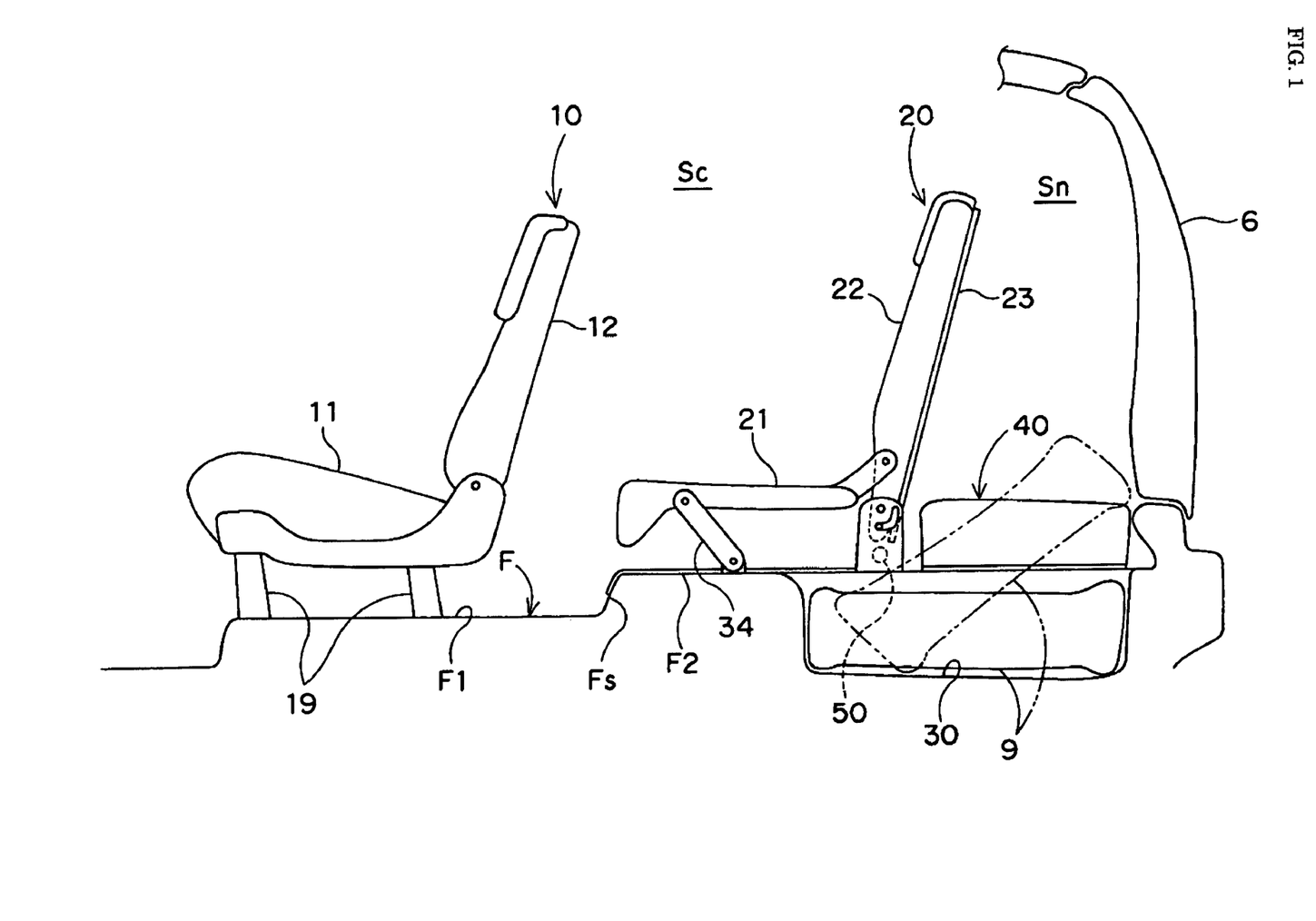
FIG. 1 is a partially sectional side view of a rear portion of a vehicle equipped with a luggage compartment structure in accordance with the preferred embodiment of the present invention, including a rear seat of the vehicle, with the seat back of the rear seat in an upright position.
Figure 2:
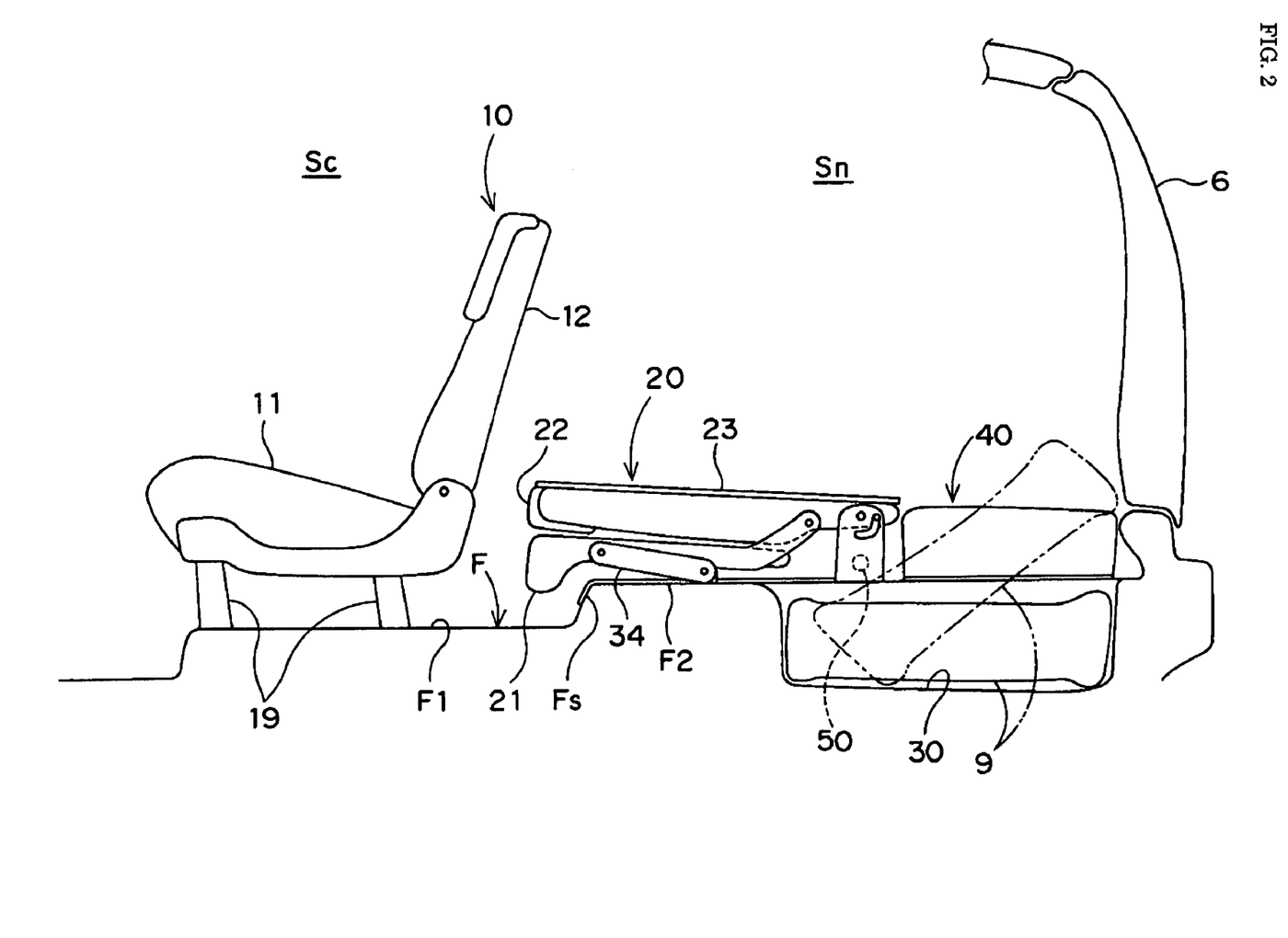
FIG. 2 is a partially sectional side view of the rear portion of the vehicle, with the seat back of the rear seat in the folded position.

A preferred embodiment of the present invention will now be described in detail with reference to the drawings. The description is made for the rearmost row of seats 20 in plural rows of seats arranged in to longitudinal direction of the vehicle, by way of example. FIG. 1 and FIG. 2 show an illustrative side view of a rear portion of a vehicle equipped with a seat belt system according to to present invention, including the rearmost row of seats. FIG. 1 includes a seat back 22 of to rearmost row of seats 20 being in an upright position. FIG. 2 includes the seat back 22 of the seat being in a folded position. The vehicle is equipped with three rows of seats disposed in the longitudinal direction of a passenger compartment Sc. FIG. 1 and FIG. 2 show only a middle seat 10 and a rear seat 20 (rearmost row of seats), omitting a front seat.

As shown in FIG. 1 and FIG. 2, a luggage compartment Sn is formed so as to substantially integrate with the passenger compartment Sc, without a partition which comparts the passenger compartment Sc and the luggage compartment Sn in the rear portion of the vehicle. The rear end of the luggage compartment Sn is defined by a so-called tailgate 6, which opens and closes the rear end. A floor F in the rear portion of the vehicle includes a front floor F1 situated lower and a rear floor F2 situated higher. The front floor F1 and the rear floor F2 continue to each other via a step Fs which raises the rear floor F2 by a predetermined amount at the rear end of the front floor F1. On the front floor F1, the middle seat 10 is disposed. On the rear floor F2, the rear seat 20 as the rearmost seat is disposed.

The floor F, being constructed as described above in the rear portion of the vehicle and including a front portion situated lower and a rear portion situated higher being connected with each other at the step, has been adopted to conventional vehicles without sacrificing commonality of platforms. For example, on the lower surface of the step, a supporting member for a rear suspension mechanism could be mounted. The middle seat is conventional in structure, comprising a seat cushion 11 and a seat back 12 constructed in such a way that the lower end of the seat back 12 is attached to the rear end of the seat cushion 11. The seat coushion 11 is fixed on the front floor F1 via a seat bracket 19.

Figure 3:
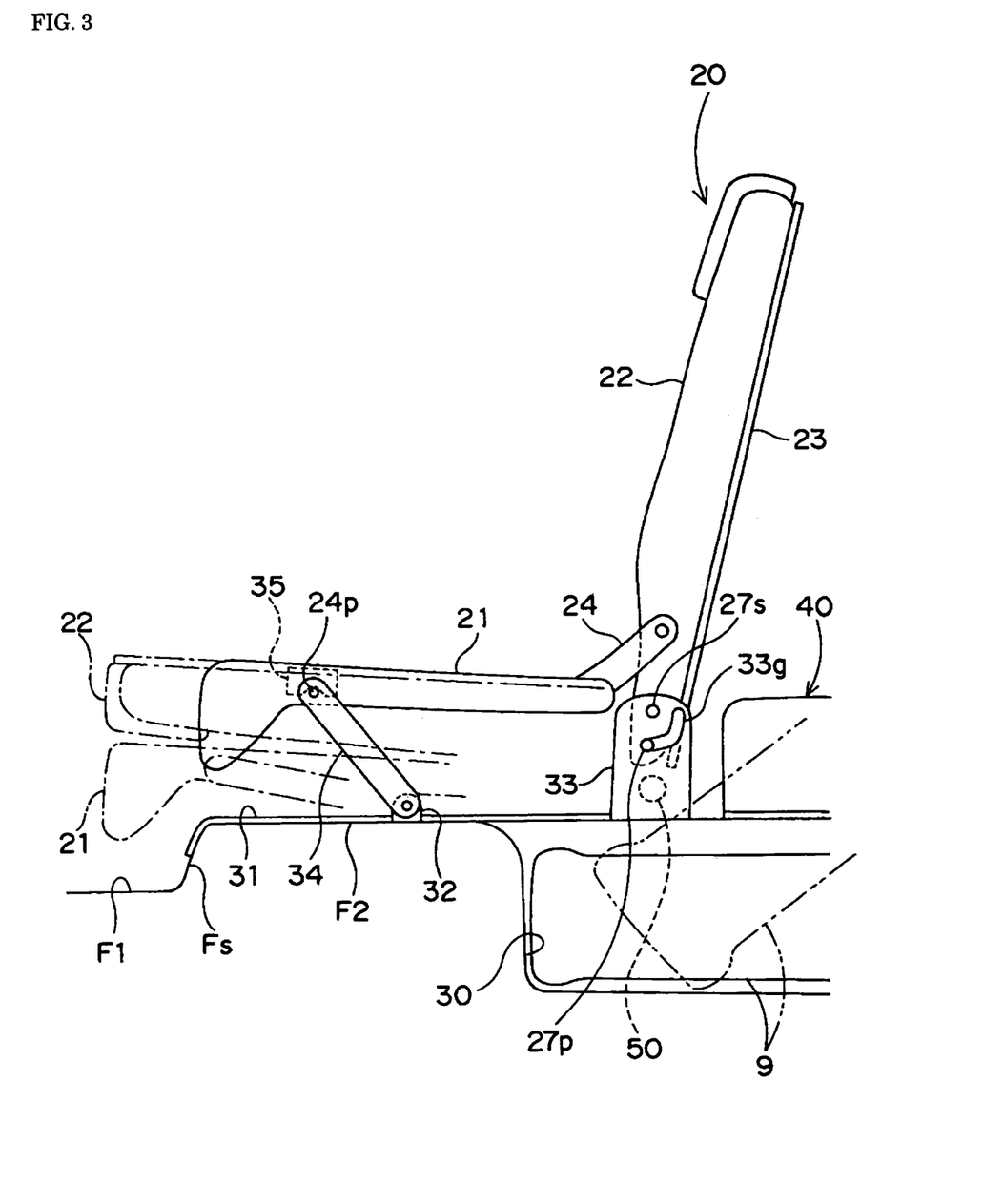
FIG. 3 is an enlarged side view of the rear seat with the seat back in the upright position.
Figure 4:
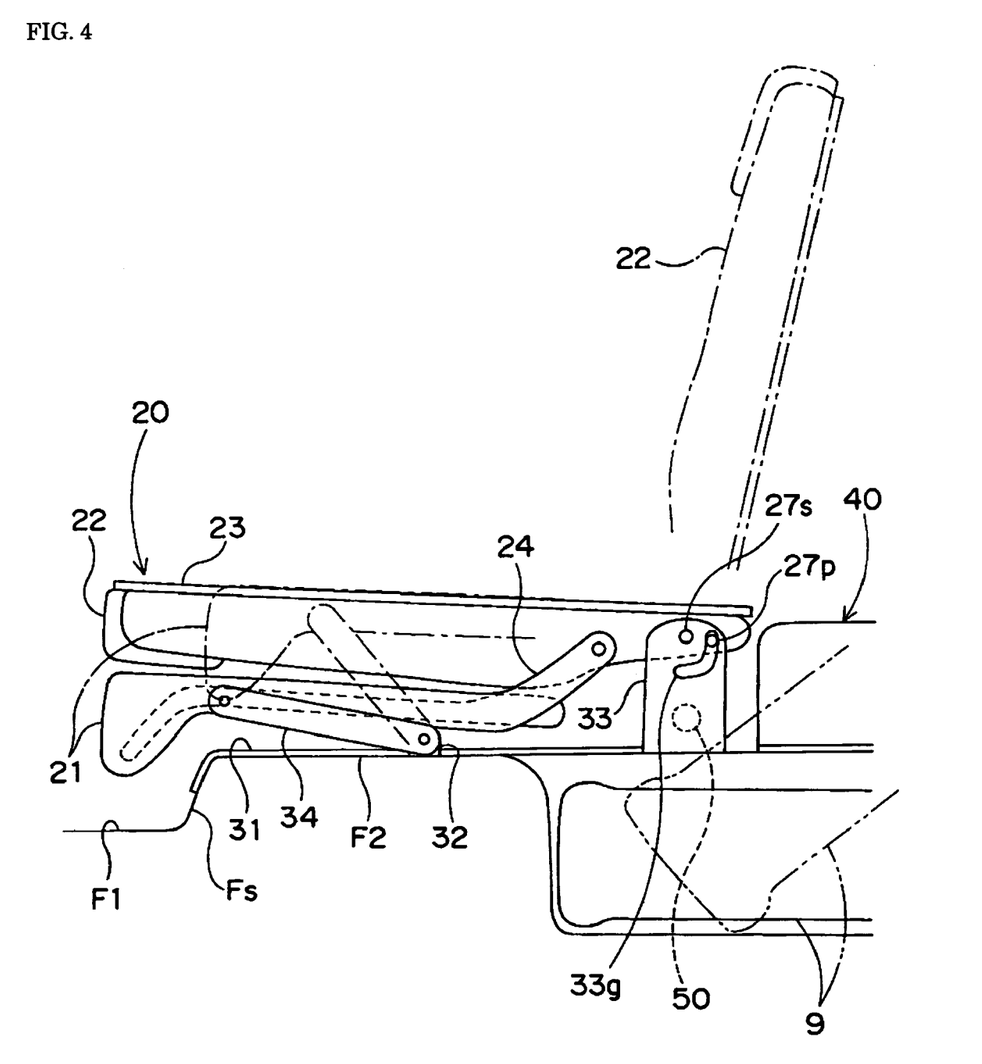
FIG. 4 is an enlarged side view of the rear seat with the rear seat in the folded position.

As shown in detail in FIG. 3 and FIG. 4, the rear seat 20 can be selectively arranged into the upright position or the folded position. With the upright position, a seat back 22 is in an upright state on the rear end of a seat cushion 21 (refer to FIG. 3). With the folded position, the seat back 22 is forwardly folded down onto the seat cushion 21 (refer to FIG. 4). The back surface of the seat back 22 is covered with a so-called decorative panel 23. On the rear floor F2 behind the rear seat 20, a box-like sub trunk 40 is provided. The sub trunk 40 is suitable for storing small packages.

Figure 5:
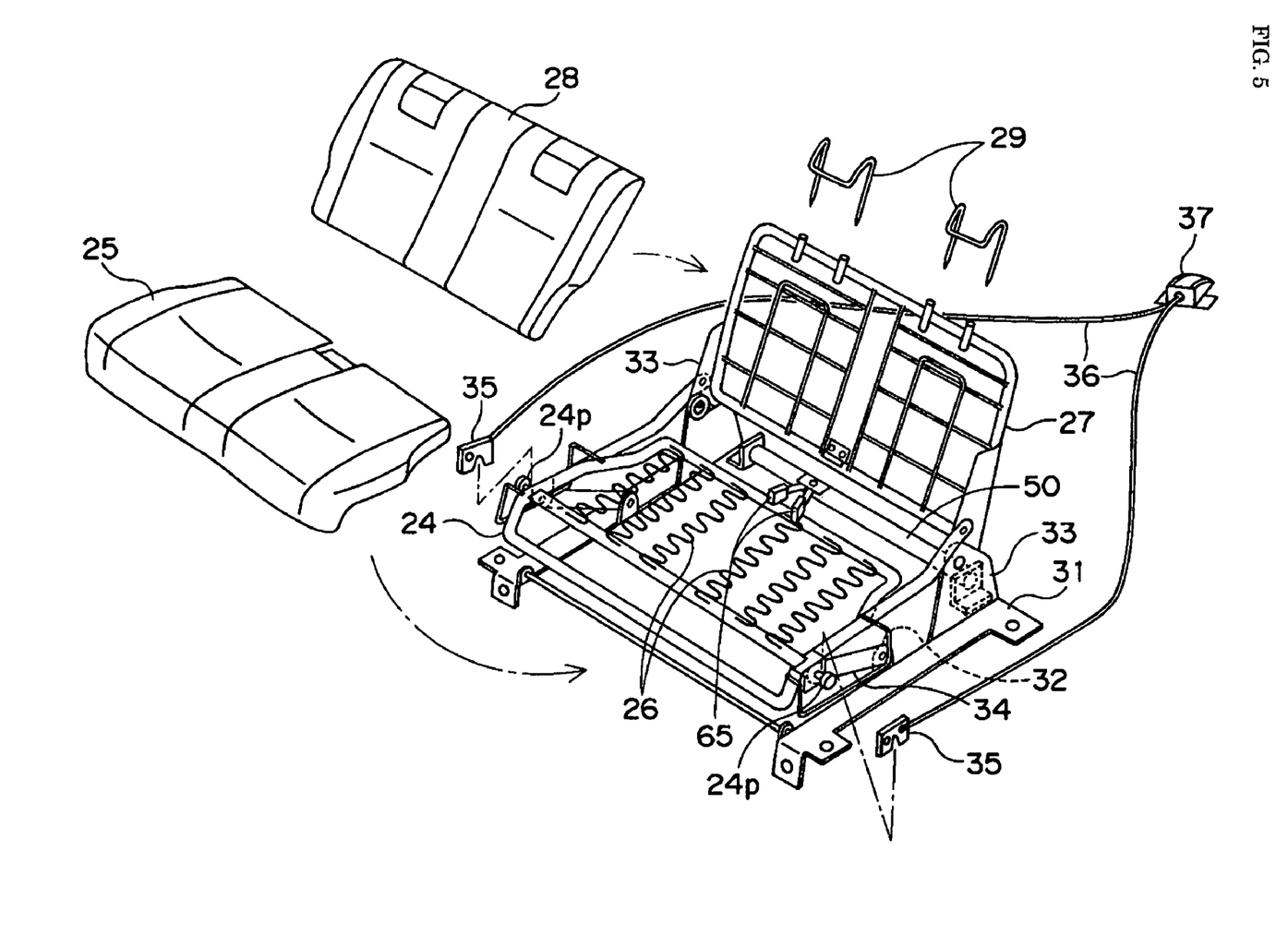
FIG. 5 is a perspective view showing a frame structure of the rear seat and its attaching structure to a floor.

FIG. 5 is a perspective view showing a frame structure of the rear seat 20 and its attaching structure onto the rear floor F2. The rear seat 20 is substantially the same as the conventional one in structure. Particularly, the rear seat 20 comprises frames (a seat cushion frame 24 and a seat back frame 27, referred to as cushion frame 24 and back frame 27, respectively hereinafter) attached with cushion bodies 25 and 28 over the frames 24 and 27. The cushion bodies 25 and 28 are made of foam or other materials with an adequate resilience. Inside the cushion frame 24, springs 26 extend across the frame 24.

At the top of the back frame 27, frames 29 of the headrest are attached. Behind and below the rear seat 20, as will be described later, a cross member 50 is provided. On the cross member 50, a buckle 65 of the seat belt system for the rear seat is fixed.

As shown in FIG. 3 through FIG. 5, on the rear floor F2, a air of right and left seat brackets 31 are fixed for mounting the rear seat 20. At a roughly middle portion and rear end portion of the seat bracket 31, a middle vertical wall 32 and a rear vertical wall 33 are formed, respectively.

The rear vertical wall 33 of the seat bracket 31 pivotally supports a pivot member 27s (referred to as pivotal axis) projecting in the vehicular lateral direction at a lower end portion of the back frame 27. The rear vertical wall is also formed with a guide slot 33g slidably receiving a pin 27p projecting in the vehicular lateral direction at the lower end portion of the back frame 27. With this structure, the seat back 22 is selectively arranged into the upright position or the folded position through the pivotal motion about the pivotal axis 27s in the forward or rearward direction with the pin 27p being guided by the guide slot 33g.

The middle vertical wall 32 of the seat bracket 31 pivotally supports a lower end portion of a link member 34 (referred to as guide link 34). A frontal portion of the cushion frame 24 is supported by the guide link 34. A rear end portion of the cushion frame 24 is pivotally supported to a lower portion of the back frame 27.

An upper portion of the guide link 34 is in pivotable engagement with a striker 24p projecting in the lateral direction of the vehicle at a frontal portion of the cushion frame 24. The striker 24p is in releasable engagement with a latch 35 which is remotely operated via a wire cable 36. The latch 35 is pivotally attached to the cushion frame 24, and caused to pivot by the operation of the switch 37 at the rear end portion of the luggage compartment Sn via the wire cable 36.

With the engagement between the latch 35 and the striker 24p, as shown in FIG. 1 and FIG. 3, the seat cushion 21 is positioned relatively higher, allowing an occupant to be seated therein. From this state, the operation of the wire cable 36 causes the latch 35 to pivot and thus disengage from the striker 24p, which in turn allows the guide link 34 to pivot forwardly and downwardly. Interlocked with the pivotal motion of the guide link 34, the seat cushion 21 is displaced forwardly and downwardly guided by the guide link 34.

The displacement of the seat cushion 21 causes the seat back 22 to forwardly pivot via the cushion frame 24, thereby arranging the seat back 22 into the folded position. On the other hand, while the seat cushion 21 is displaced rearwardly and upwardly to arrange the seat back 22 into the upright position, each of the members act in the reverse of the description above.

As described above, no partition separates the passenger compartment Sc and the luggage compartment Sn, and thus the luggage compartment Sn is substantially integrated with the passenger compartment. However, with the seat back 22 of the rear seat 20 in the upright position, the seat back 22 of the rear seat 20 acts as the partition between the passenger compartment Sc and the luggage compartment Sn (refer to FIG. 1). With the seat back 22 of the rear seat 20 in the folded position, the seat back 12 of the middle seat 10 acts as the partition between the passenger compartment Sc and the luggage compartment Sn, while the luggage compartment Sn is expanded (refer to FIG. 2).

The seat cushion 21 of the rear seat 20 is reduced in thickness as much as possible to attain a largely-expanded luggage compartment Sn with the seat back 22 in the folded state. In order to offer the favorable seating comfort to a seated occupant, however, the cushion frame 24 of the seat cushion 21 is formed so as to bend down towards its front end. With the cushion frame 24 taking this shape, the thickness of the cushion material is ensured at its frontal and upper portion, thereby offering the favorable seating comfort of the seat 20.

Components of seat cushion 21 (e.g., cushion frame 24 and the guide link 34) are dimensioned so that the downwardly extending front end of the cushion frame 24 is located ahead of the step Fs in the vehicular floor F, after the seat cushion 21 is displaced forward and down, interlocked with the folding-down motion of the seat back 22. On the lower surface of the step Fs, there are fixed components such as the supporting member for the rear suspension mechanism, which are not shown in detail.

As described above, the rear seat 20 is disposed on the higher-situated rear floor F2 continuing to the lower-situated front floor F1 via the step Fs. When the seat back 22 is folded down onto the seat cushion, the fold-down motion of the seat back 22 causes the seat cushion 21 to move forward and down via the action of the guide link 34. This lowers the height of the seat in the folded position, thereby increasing a loading capacity of the vehicle. At this time, the front end of the cushion frame 24, being bent down, is located ahead of the step Fs in the vehicular floor F, which causes no interference between the front end of the cushion frame 24 and the rear floor F2.

Moreover, when the seat back 22 is folded down, its fold-down motion causes the front end of the cushion frame 24 of the seat cushion 21 to be forwardly shifted up to the position ahead of the step Fs in the vehicular floor F. This avoids interference between the seat 20 and the luggage during the arrangement operation of the seat back 22 into the folded position, even with luggage stored behind the seat back 22 in the upright position. Therefore, the seat back 22 is arranged into the folded position without degradation in utility.

Figure 7:
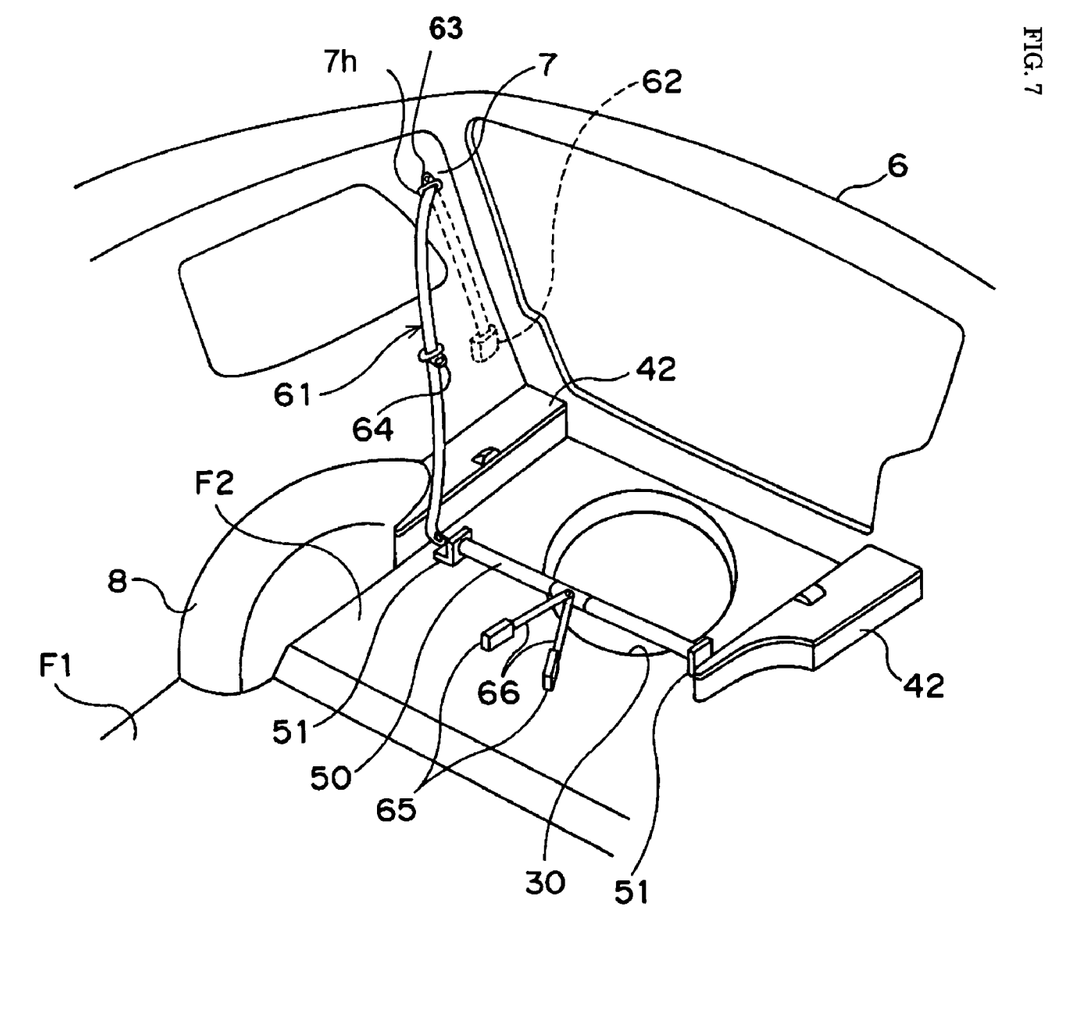
FIG. 7 is a perspective view of the luggage compartment with a storage recess being exposed by removing a central section of the sub trunk.

In the rear floor F2 of the floor F in the rear portion of the vehicle, a storage recess 30 is formed receding downwardly. A front portion of the storage recess 30 is concealed by the rear seat 20, and a rear portion of the storage recess 30 is concealed by the sub trunk 40. The storage recess 30 is preferably dimensioned so as to store a spare tire 9 for the vehicle. Particularly, as shown in FIG. 7 described later, the recess 30 is circular with a predetermined diameter in a top plan view, and has a predetermined depth.

In conventional vehicles, a recess is generally formed in a floor of a luggage compartment for storing a spare tire or other parts. The storage recess 30 is attained by use of the recess, thus does not sacrifice commonality of platforms among vehicular bodies.

As described above, with the seat back 22 of the rear seat 20 in the folded position, the back surface of the seat back 22 and the upper surface of the sub trunk 40 align with each other. Thus, the seat 20 can be stored with its seat back 22 in the folded position without any dedicated recess in the floor, which does not sacrifice commonality of platforms among vehicular bodies. Moreover, relatively larger luggage can be stored on the continuous planar surface constituted by the back surface of the seat back and the upper surface of the sub trunk 40. Even with the seat back 22 in the folded position, the decorative panel 23 on the back surface of the seat back 22 faces upwardly, without any degradation in visual appearance.

Figure 6:
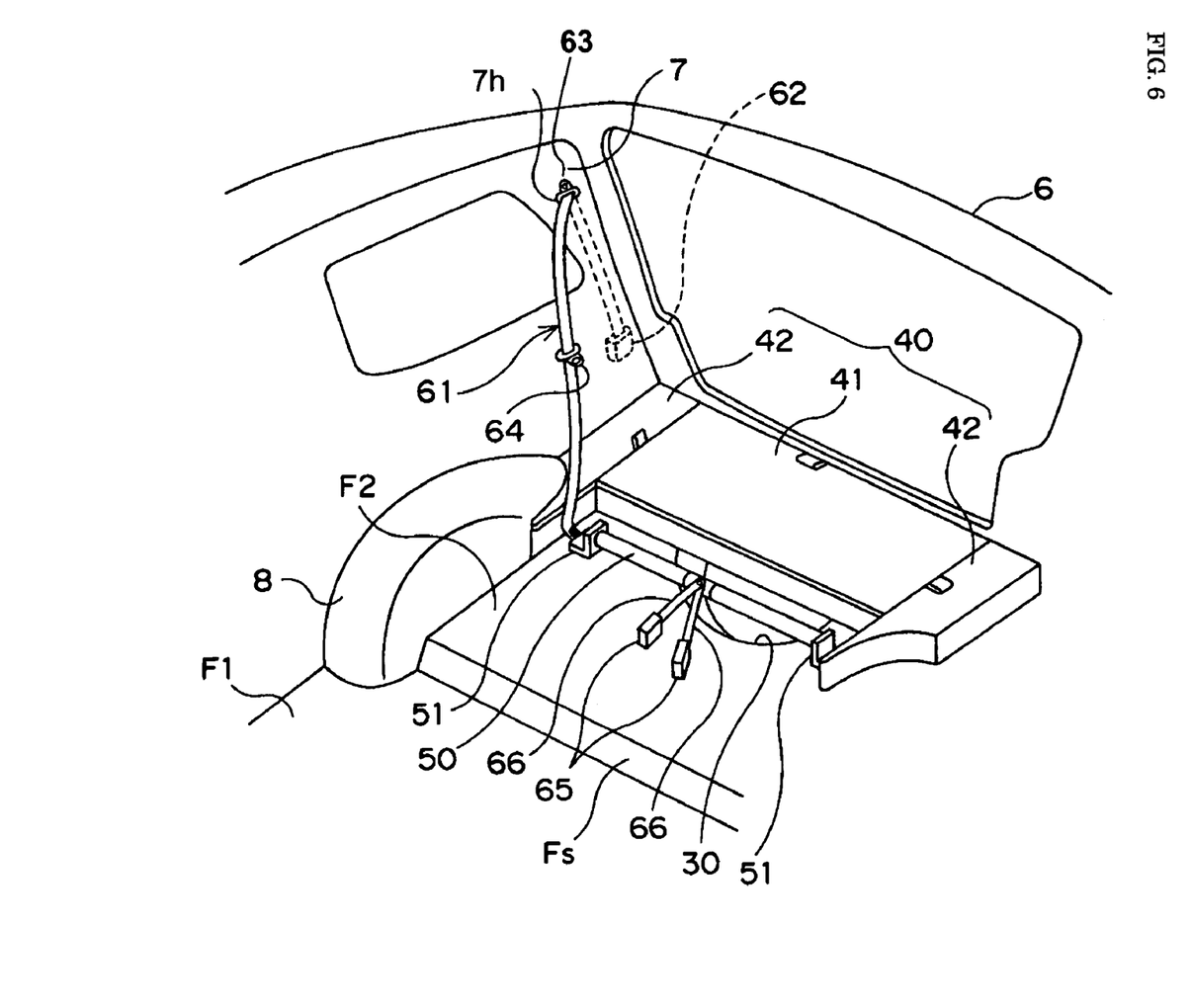
FIG. 6 is a perspective view of a luggage compartment with a sub trunk disposed on the floor in the luggage compartment of the vehicle.

Further, luggage can be stored in the storage recess 30 formed in the rear floor F2 and below the rear seat 20 and the sub trunk 40. Thus, a larger loading capacity is ensured in comparison with conventional structures. Additionally, when the rear seat is in an upright position, the storage recess 30 is concealed by the rear seat 20 from above at the frontal portion, and concealed by the sub trunk 40 from above at the rear portion, which does not impair visual appearance. Moreover, even with the sub trunk 40 being provided on the rear floor F2 behind the rear seat 20, the storage recess 30 is dimensioned so as to store the spare tire 9 of the vehicle, which allows the spare tire 9 to be smoothly stored below the sub trunk 40 and the rear seat 20, As shown in FIG. 6, the sub trunk 40 comprises a central section 41 at the laterally central position, and a pair of side sections 42 on the right and left sides of the central section 41, respectively. The central section 41 is removably attached to the rear floor F2. The side sections 42 are permanently attached to the rear floor F2 rearward of wheel wells 8.

The right and left side sections 42 are box-shaped and elongated in the longitudinal direction, and the central section 41 is box-shaped, elongated in the lateral direction and compressed in the vertical direction. With the central section 41 of the sub trunk 40 being attached to the rear floor F2, the storage recess 30 is concealed when viewed from above. Instead of the separated structure of the sub trunk 40 being partly removable from the floor F2, the sub trunk 40 may be formed as a one body being removable from the floor F2 as a whole.

As described above, the sub trunk 40 is constructed so that at least a part of the sub trunk 40, concealing the rear portion of the storage recess 30 when viewed from above (the central section 41), is removably attached to the floor F2 of the luggage compartment Sn. This allows some materials (particularly, spare tire 9) to be smoothly stored in the storage recess 30. Additionally, the sub trunk 40 can be detached if unnecessary, enhancing the utility.

More advantageously, the sub trunk 40 is separated into a central section 41 and side portions 42 on the right and left sides, with the central section 41 being removably attached to the rear floor F2 and the side section 42 being permanently attached to the rear floor F2. Thus, the volume of the removable section is smaller, thereby enhancing the ease in detaching/attaching operation of the sub trunk 40.

Figure 8:
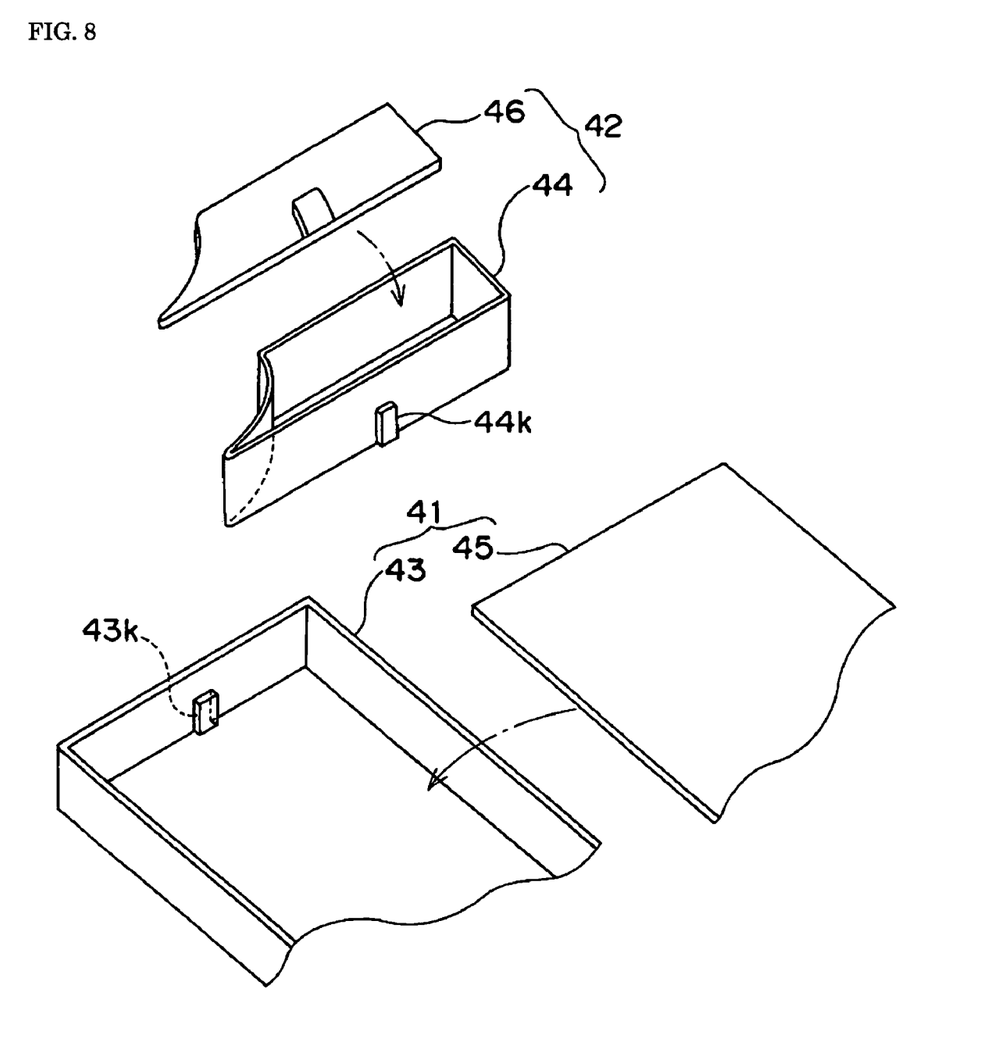
FIG. 8 is a perspective view showing the structure of the central section and side sections of the sub trunk.
Figure 9:
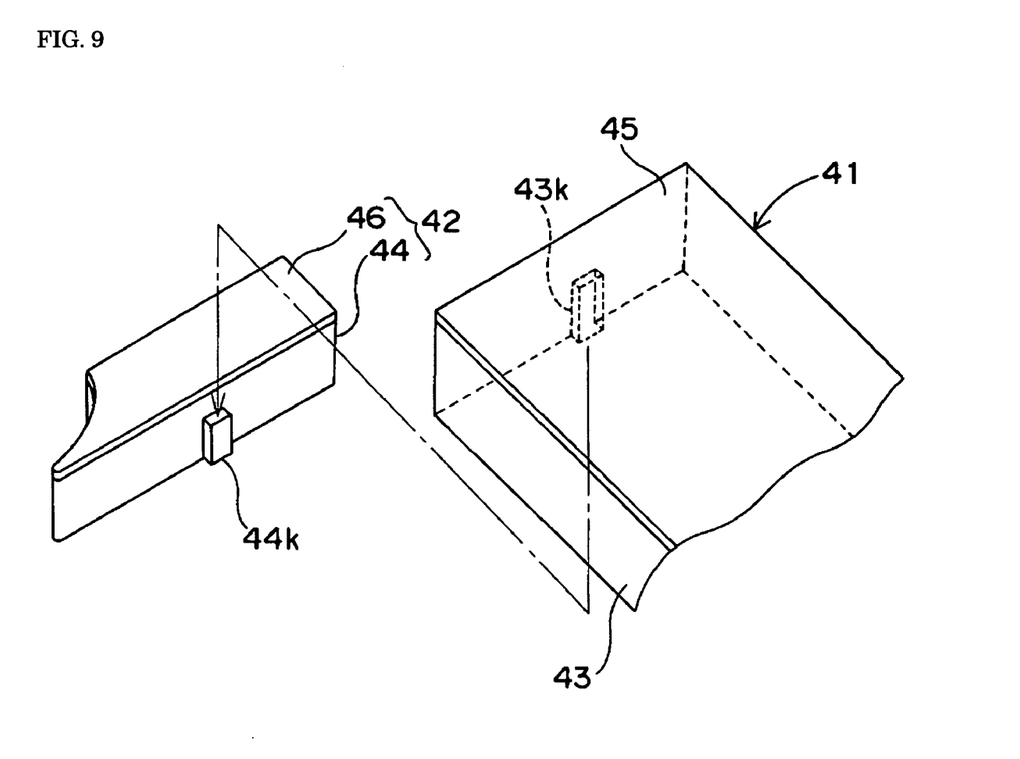
FIG. 9 is a perspective view of an engaging portion between the central section and the side sections of the sub trunk.

As shown in FIG. 8 and FIG. 9, the central section 41 and the side sections 42 of the sub trunk 40 are formed in a box-shape which can be opened and closed. Particularly, the sections 41 and 42 comprise box-shape main bodies 43, 44, and cover plates 45, 46. The cover plates 45, 46 cover the main bodies 43, 44 from above so as to open and close them, respectively. Front portions of the side sections 42 are formed in curved surfaces matching the shape of the rear portion of the wheel well 8 of the vehicular body.

An inboard surface of the box-shape main body 44 of the side section 42 is provided with an engagable projection 44k. An outboard surface of the box-shape main body 43 of the central section 41 is provided with an engaging recess 43k corresponding in position to the engagable projection 44k. With this structure, the engaging recess 43k engages with or disengages from the engagable projection 44k of the side section 42, when the central section 41 is lifted down into attachment with the floor F2 or lifted up away from the floor F2.

As described above, an engagement structure, comprising the engaging recess 43k and the engagable projection 44k, is provided between the central section 41 and the side sections 42 of the sub trunk 40 so as to allow the central section 41 to removably engage with the side sections 42. This enhances ease in attaching/detaching operation of the central section 41, and ensures secure engagement of the central section 41 with the side sections 42 (in other words, with the rear floor F2) during the use of the central section 41.

Described next is a seat belt system for the rear seat 20.

As shown in FIG. 6 and FIG. 7, a retractor 62 of the seat belt system for the rear seat 20 is attached within an interior trim 7 constituting a rear side surface of the luggage compartment Sn. A seat belt webbing 61 is reeled out from the retractor 62 to extend upwardly, and drawn inboardly through a slot 7h in the trim 7. Then, the webbing 61 turns downwardly at a shoulder anchor 63, and reaches the rear floor F2 to which its distal end is fixed. At a midway point of the inboardly-drawn portion of the belt webbing 61, a tongue 64 is provided.

As apparent from FIG. 6 and FIG. 7, a cross member 50 is provided in this embodiment. The cross member 50 extends substantially across the width of the vehicle above the storage recess 30 and fixed to the vehicular body at its opposite ends. Particularly, the opposite ends of the cross member 50 are fixed to a pair of brackets 51 attached near laterally opposite ends of the floor F2 in the luggage compartment Sn, respectively. With this structure, the cross member 50 allows the seat belt tension to be directly transmitted to the vehicular body not through the rear seat, even with the storage recess 30 receding downwardly in the floor F2 of the luggage compartment Sn immediately behind the rear seat 20. The cross member 50 may not be limited to the straight shape as shown in the drawings, but formed in other forms such as a curvature. In addition, the cross-section of the cross member 50 is not limited to the circle as shown in the drawings, but formed in other shapes such as a rectangle.

At the cross member 50, a first end of a buckle connecting member 66 is fixed. The other end or a second end of the buckle connecting member 66 is connected with a seat belt buckle 65 which is releasably engagable with the tongue 64 of the belt webbing 61. Two sets of the buckle 65 and the buckle connecting member 66 are correspondingly provided for a right side seat and a left side seat. The buckle connecting member 66 preferably comprises the seat belt webbing 61.

As described above, the end portion of the buckle connecting member 66 is fixed to the cross member 50. Thus, during a vehicular collision or other accidents, load acting on the belt webbing 61 with the engagement between the tongue 64 and the buckle 65 is transmitted to the vehicular body through the cross member 50. That is, even with the storage recess 30 receding downwardly in the floor F2 of the luggage compartment Sn immediately behind the rear seat 20, load acting on the seat belt webbing 61 is directly transmitted to the vehicular body without transmitted through the rear seat 20.

As a result, less rigidity is required for the rear seat 20, which reduces the thickness of the seat cushion 21 (hence the entire seat). Especially, less rigidity is required for the rear seat 20 which is selectively arranged into the upright position of the seat back 22 or the folded position of the seat back 22, so that the seat cushion 21 is further reduced in its thickness, thereby attaining largely-expanded luggage compartment Sn. Moreover, the cross member 50 advantageously increases the rigidity of the rear floor F2.

The cross member 50 is located so as to cause no interference with the spare tire 9 during loading/unloading work of the spare tire 9 to/from the storage recess 30 as a spare-tire well (refer to FIG. 1 and FIG. 2). Accordingly, even in a vehicle which stores the spare tire 9 in the storage recess 30 in the rear floor F2 immediately behind the rear seat 20, the load acting on the seat belt webbing 61 is directly transmitted to the vehicular body during a vehicular collision or other accidents while spare tire 9 can be easily stored.

The cross member 50 is located so as to be concealed by the seat back 22 with the seat back 22 in the folded position (refer to FIG. 2 and FIG. 4). Accordingly, the cross member 50 is prevented from impairing the visual appearance of the luggage compartment Sn with the seat back 22 in the folded position.

As described above, the rear seat 20 is selectively arranged into the upright position of the seat back 22 or the folded position of the seat back 22, and the seat cushion is mounted on the rear floor F2 so as to move in at least one of the longitudinal direction and the vertical direction of the vehicle (in both the directions in this embodiment) during the arrangement operation of the seat back 22. The buckle connecting member 66 accommodates the motion of the seat cushion.

Figure 10:
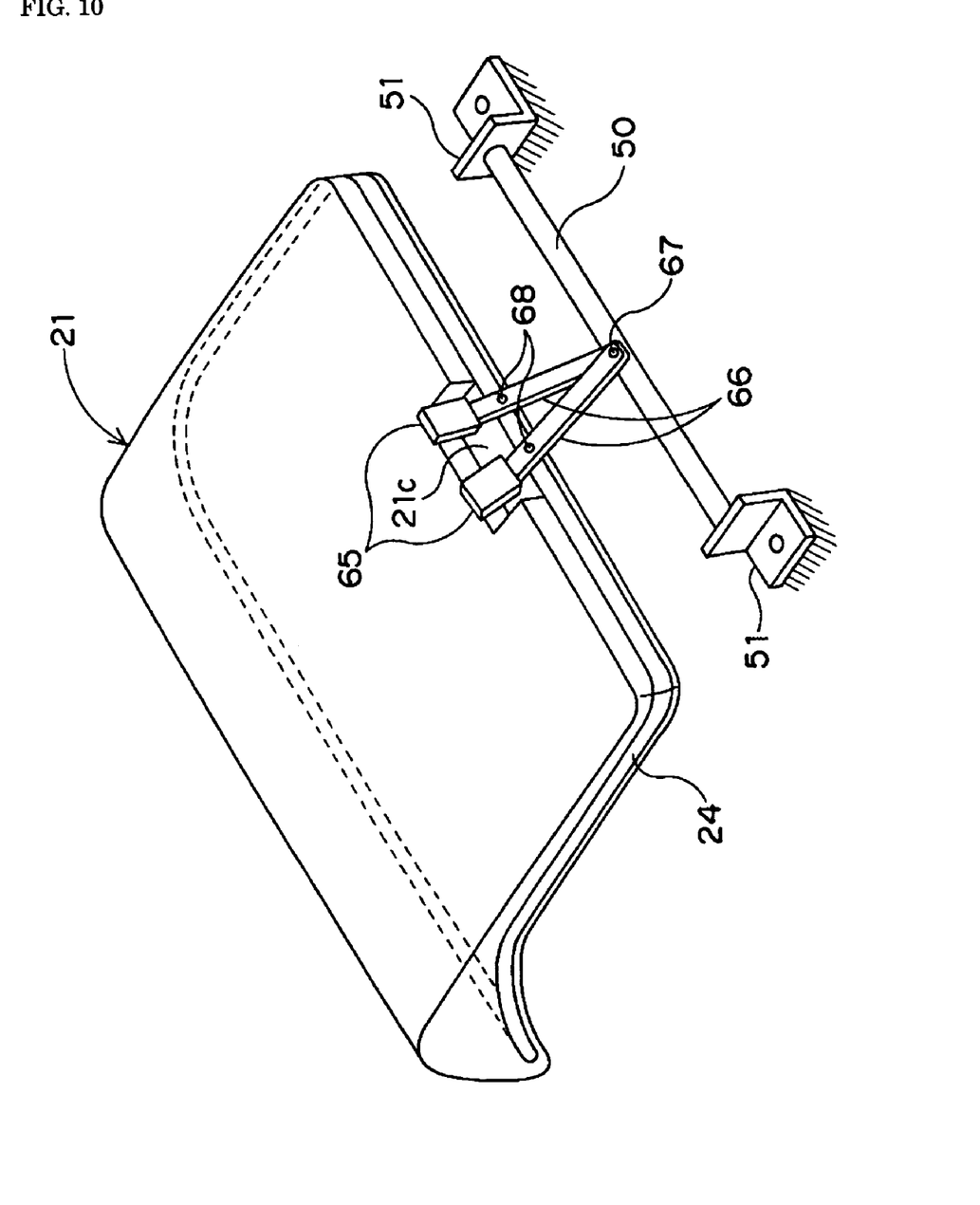
FIG. 10 is A perspective view of a seat cushion of the rear seat, a buckle of a seat belt system for the seat, and a cross member.

As shown in FIG. 10, the buckle connecting member 66 is attached to the seat cushion 21 (particularly, at the rear end of the cushion frame 24) via a second fixing portion 68 located between the buckle 65 and a fixing portion 67 (a first fixing portion) to the cross member 50. The buckle connecting member 66 may be fixed to the cross member 50 and the cushion frame 24 by use of a variety of conventional methods such as screwing or riveting.

Figure 11:
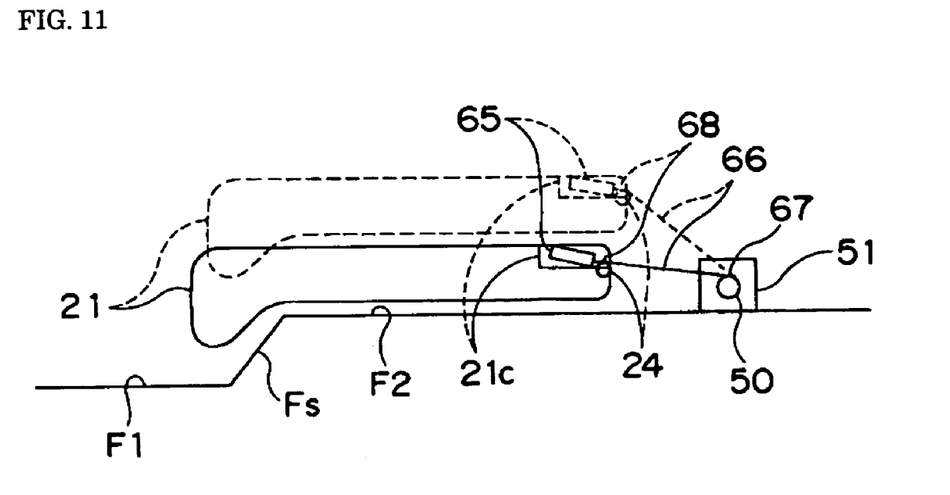
FIG. 11 is an illustrative view showing an example of the length of a buckle connecting member.

The length between the first fixing portion 67 and the second fixing portion 68 is predetermined so as to allow the buckle connecting member 66 to accommodate the motion of the seat cushion 21. Particularly, the distance between the first fixing portion 67 and the second fixing portion 68 is maintained substantially constant during the motion of the seat cushion 21 as shown in FIG. 11. In other words, the guide link 34 of the rear seat 20 is concurrently dimensioned so as to guide the seat cushion 21 while maintaining a substantially constant distance between the first fixing portion 67 and the second fixing portion 68.

As described above, the buckle connecting member 66 is attached to the seat cushion 21 via a second fixing portion 68 located between the buckle 65 and a fixing portion 67 to the cross member 50. Accordingly, the buckle 65 is prevented from adversely dropping down through the clearance between the seat back 22 and seat cushion 21. In addition, the length between the first fixing portion 67 and the second fixing portion 68 is predetermined so as to allow the buckle connecting member 66 to accommodate the motion of the seat cushion 21. Accordingly, in spite of the fact that the seat cushion 21 is movable in at least one of the longitudinal direction and vertical direction of the vehicle following the selective arrangement operation of the seat back 22, the buckle connecting member 66 causes no interference with the motion of the seat cushion 21.

Particularly, in this case, the guide link 34 provided in the rear seat 20 guides the motion of the seat cushion 21 while maintaining a constant distance between the first fixing portion 67 and the second fixing portion 68, preferably during the motion of the seat cushion 21. This eliminates the need for tolerance from the buckle connecting member 66, thereby further enhancing the occupant-restraint performance of the seat belt webbing 61 during an automotive collision or other accidents.

Figure 12:
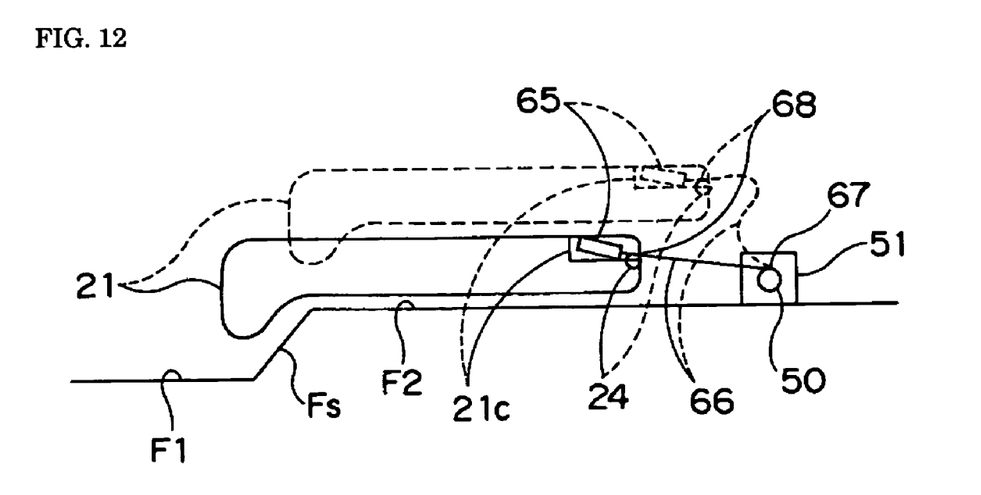
FIG. 12 is an illustrative view showing another example of the length of a buckle connecting member.

Instead, as shown in FIG. 12, the buckle connecting member 66 may include tolerance (as indicated by broken lines in FIG. 12) which allows the buckle connecting member 66 to accommodate the motion of the seat cushion 21. This does not require high dimensional accuracy in the components interlocked with the motion of the seat cushion 21 guided by the guide link 34, thereby easing in production and reducing its cost.

Moreover, as apparent from FIG. 10, a depression 21c is formed on an upper and rear portion of the seat cushion 21 (particularly, on a upper and rear portion of the cushion body 25) for storing the buckle 65. Accordingly, even with the seat back 22 in the folded position, the buckle 65 is stored in the depression 21c, thereby lowering the height of the seat. This further expands the luggage compartment Sn.

Although the above description is made for an automobile equipped with three rows of seats, the present invention is not limited to such an automobile. For example, the present invention may be advantageously implemented with vehicles having conventional two rows of seats or four or more rows of seats, wherever the vehicles have a luggage compartment substantially integrating with a passenger compartment in a rear portion of the vehicle. Moreover, the present invention is not limited to the rearmost seat. For example, the present invention may be advantageously adopted to other seats such as the foremost seat or second row of seats, wherever a recess is formed receding downwardly in a floor immediately behind the seat. In this manner, the present invention is not limited to the embodiment above, but may be subjected to a variety of modification or engineering change without departing from the scope of the invention.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

We claim:

1. A seat belt system for a vehicle, the vehicle including a seat disposed on a floor of the vehicle and a recess formed downwardly in the floor immediately behind the seat, comprising,     a cross member fixed to a vehicle body at its opposite ends so as to extend across the width of the vehicle above the recess, and     a buckle connecting member connected with a buckle of a seat belt for the seat at one end and connected with said cross member at another end;

wherein the seat is selectively arranged into an upright position where a seat back of the seat is substantially upright near the rear edge of a seat cushion of the seat, or into a folded position where the seat back is forwardly folded down onto the seat cushion of the seat, and the seat cushion is mounted on the vehicle floor movably in at least one of the longitudinal direction and vertical direction of the vehicle following the selective arrangement operation of the seat back,     wherein said buckle connecting member is fixed to said cross member at a first fixing portion and fixed to the seat cushion at a second fixing portion between said first fixing portion and the buckle, and the length between said first fixing portion and said second fixing portion is predetermined so as to allow said buckle connecting member to accomodate the motion of the seat cushion.

2. The seat belt system for a vehicle as defined in claim 1,
wherein the recess is provided for storing a spare tire, and said cross member is located so as to cause no interference with the spare tire during loading and unloading of the spare tire into and from the recess.

3. The seat belt system for a vehicle as defined in claim 1,
wherein a first guide mechanism is provided for guiding the motion of the seat cushion while maintaining a substantially constant distance between said first fixing portion and said second fixing portion during the motion of the seat cushion.

4. The seat belt system for a vehicle as defined in claim 1,
wherein a depression is formed on an upper portion of the seat cushion for storing the buckle.

5. The seat buckle system for a vehicle as defined in claim 1,
wherein said cross member is concealed by the seat back from above when the seat back is in the folded position.

6. The seat belt system for a vehicle as defined in claim 1, vehicle further comprising,
a box-like sub trunk removably provided behind the seat,
wherein the seat and the sub trunk are positioned so that a back surface of the seat back and an upper surface of the sub trunk substantially align with each other, and the recess is covered with the seat back at its front portion and covered with the sub trunk from above at its rear portion, with the seat back in the folded position.

7. The seat belt system for a vehicle as defined in claim 6,
wherein the sub trunk comprises a central section at the laterally central position and a pair of side sections on the right and left sides of the central section, respectively, with the sides sections being permanently attached to the floor behind the seat, and the central section being removably attached to the floor behind the seat.

8. The seat belt system for a vehicle as defined in claim 7,
wherein an engagement structure is provided between the central section and the side sections so as to allow the central section to releasably engage with the side sections.

9. The seat belt system for a vehicle as defined in claim 6,
wherein the floor includes a lower-situated front floor, a higher-situated rear floor continuing to the front floor, and a step raising the rear floor at the rear edge of the front floor by a predetermined height,
the seat is mounted on the rear floor,
the seat cushion comprises a seat cushion frame bending down towards its front edge and a cushion material covering at least over the cushion frame, and
a second guide mechanism is provided which downwardly displaces the seat cushion during the fold down operation of the seat back and guides the seat cushion so that the front edge of the seat cushion frame is located ahead of the step with the seat back in the folded position.

10. A seat belt system for a vehicle, comprising,
a cross member, fixed to a vehicle body at its opposite ends so as to extend across a width of the vehicle above a recess formed downwardly in a floor of the vehicle immediately behind at least one seat,
the seat including a seat back and a seat cushion, and being selectively arranged into an upright position where the seat back is in substantially upright near the rear edge of the seat cushion, or into a folded position where the seat back is forwardly folded down onto the seat cushion,
a buckle connecting member connected with a buckle of a seat belt for the seat at one end connected with said cross member at the other end, and
a box-like sub trunk removably provided behind the seat,
wherein the seat and the sub trunk are adapted so that a back surface of the seat back and an upper surface of the sub trunk substantially align with each other, and the recess is covered with the seat back from above at its front portion and covered with the sub trunk from above at its rear portion, with the seat back in the folded position, and
wherein said cross member is concealed by the seat back from above when the seat back is in the folded position.

11. A seat belt system for a vehicle, comprising,
a cross member fixed to a vehicle body at its opposite ends so as to extend across the vehicle width above a recess formed downwardly in a vehicle floor immediately behind at least one seat,
the seat including a seat back and a seat cushion, being selectively arranged into a upright position where the seat back is in substantially upright near the rear edge of the seat cushion, or into a folded position where the seat back is forwardly folded down onto the seat cushion,
a buckle connecting member connected with a buckle of a seat belt for the seat at one end and connected with said cross member at the other end, and
a box-like sub trunk removably provided behind the seat,
wherein the seat and the sub trunk are adapted so that a back surface of the seat back and an upper surface of the sub trunk substantially align with each other, and the recess is covered with the seat back from above at its front portion and covered with the sub trunk from above at its rear portion, with the seat back in the folded position.

* * * * *